June 6, 1939.   R. MÖLLER   2,160,888
METHOD OF RECORDING TELEVISION IMAGES
Filed Dec. 10, 1935
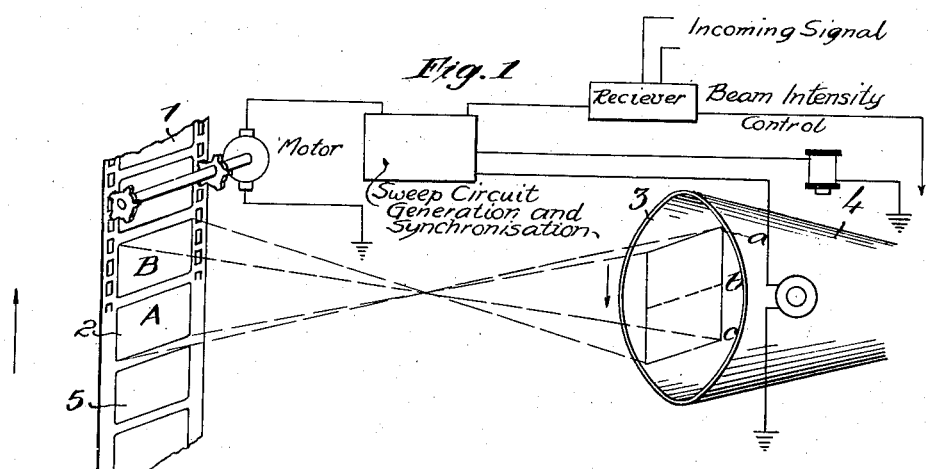
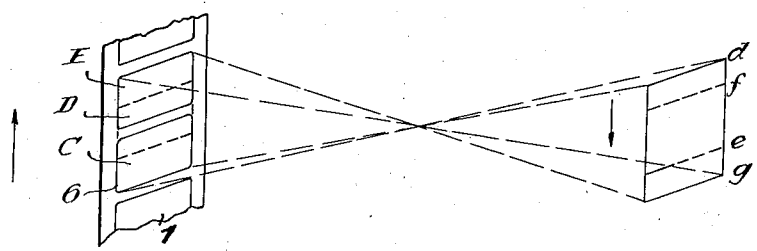
Inventor
Rolf Moller
Lippincott and Metcalf Patented June 6, 1939

2,160,888

UNITED STATES PATENT OFFICE 2,160,888

METHOD OF RECORDING TELEVISION IMAGES

Rolf Möller, Berlin-Zehlendorf, Germany, assignor to the firm of Fernseh Aktiengesellschaft, Zehlendorf, near Berlin, Germany Application December 10, 1935, Serial No. 53,785
In Germany December 12, 1934

2 Claims. (Cl. 178—7.5)

This invention relates to a method of obtaining pictorial records for television purposes by producing separate pictures on a record carrier with the aid of electronic rays. When indirectly recording according to this method it is possible intermittently or continuously to move the carrier or film and to produce the records on the stationary or moving film.

If a constantly moving film is used, it is naturally convenient to deflect the electronic ray in one direction only and to insure motion in the vertical direction thereto as required for producing a picture by uniformly moving the film.

However, it has been found that the constant use of a single line of the screen renders the fluorescent mass unserviceable within a relatively short time, as the screen will burn. Other troubles are often due to the afterglow of the screen.

To eliminate these drawbacks the invention proposes to fully light the screen without requiring intermittent motion of the film for recording the images, and the invention attains its end by deflecting the ray transversely to the direction of the lines which thus travel on the film in the direction of motion thereof. The line distances on the screen are chosen so that the lines are traced in proper succession on the moving film.

By way of example, the invention is illustrated in the accompanying drawing, in which Figures 1 and 2 diagrammatically show two applications of the method, Fig. 1 also including a block schematic diagram of a circuit which may be used to accomplish the hereinafter described method.

Referring to the drawing, and first to Fig. 1, 1 is the film which moves upwardly at uniform speed. Since the process equally applies to all pictures, it is thought sufficient to describe below the recording of a single picture 2 which first occupies the position A and during the exposure of a picture moves into the position B. This movement of the film is accomplished by any well known means, such as the motor shown in Fig. 1. During the time of exposure all lines must be traced on the film, and consequently the sweep circuit is adjusted and synchronized with the motor so that there is a complete scanning of the luminescent screen 3 during the time that is required for the film element 2 to move from the position A to the position B. The picture composing lines are therefore produced on the screen 3 of the electronic tube 4 in the order indicated by a, b, c, so that the first line is recorded in the lowest position A of the picture 2 at the lower edge thereof and the last line of the picture concerned in the position B at the upper edge thereof. When the picture 2 has reached the position B, a new image area 5 will be in the position A, and the first line of the following picture will be produced again at a.

It will be obvious that the effects to be produced are dependent merely upon the proper relationship between the deflection of the cathode ray beam which excites the fluorescent screen and the speed at which the film is progressed. With a constantly moving film the deflection of the beam must be of uniform rate during the transmission of each frame. The method by which such deflection is accomplished is of minor importance, since either electrostatic or electromagnetic deflection may obviously be used. For example, a deflection system such as is described and shown diagrammatically in Patent No. 2,051,372, issued August 18, 1936, is one method adapted to this purpose, but electrostatic systems such as are well-known in the art may also be used.

As has been stated the fluorescent screen must be large enough to display two complete picture frames. The scanning potential in the direction of motion of the film must be of sufficient amplitude to deflect the beam over the double frame width, so that the beam is progressed between successive lines by a distance corresponding to the distance between the lines on the carrier plus the distance moved by the carrier between successive scansions. Any type of optical system which will project the required size of image of the frame area upon the film, and will cover the area of the two frames will prove satisfactory.

The method described permits of variation according to requirements, and Fig. 2 shows that recording may be effected also by tracing two successively transmitted pictures in the same field 6. This may be desirable for instance if pictures rich in contrast are to be produced for subsequent projection at which the picture speed need not be so high as during the transmission concerned. It is then possible to proceed by once scanning the entire picture area during the first half of the motion of the picture 5 from the position C into the position D by producing the lines of the screen portion d—e. The ray is then passed from e to f, and the screen portion between f and g is utilized for recording the second picture, so that the lines fall upon the image field that has travelled in the meantime, the last line g being then traced as the top line in the position E of the picture 5.

In order to take advantage of the system here described, it is only necessary that the film be driven at the same speed which would be required were the ordinary line-by-line scanning used wherein the entire vertical scanning component is supplied by the film motion. Any of the well known methods used for keeping a mechanical television receiver in step with the transmitter may be used for this purpose, e. g., a system such as that shown in my prior Patent Number 1,993,564, dated March 5, 1935.

The deflection of the cathode ray is also accomplished by any of the well known means. The deflection may be either electromagnetic or electrostatic. The form of deflection is the well-known sawtooth wave, and all of the generators which have been suggested for supplying such waves are adjustable as to the magnitude of deflection. It is sufficient so to adjust the vertical scanning generator that the amplitude of deflection produced thereby is twice that which would be used if the image were to be viewed directly by eye.

Where the scanning frequency bears a definite integral relationship to the frequency of electrical supply, e. g., 60 cycles in the United States or 50 cycles, as standard in Europe, it is not even necessary that special synchronizing means be used on the film drive, since the only error introduced by such slight frequency variations between picture frequency and supply frequency as would ordinarily occur will cause only a slight distortion as between the vertical and horizontal dimensions of the picture field. It is not observable to the eye.

Well-known instrumentalities may also be used in the modification of the method which is shown in Fig. 2. Here it is only necessary that the successive sawtooth waves of the vertical deflection be of alternately different magnitudes, and this can readily be accomplished by several means, as shown, for example, in the British patent to Baird, Number 423,101, accepted January 21, 1935.

If a film record is to be produced, in which only every second image field is filled, the film is simply moved to the extent of the width of two picture frames and the lines are produced on the screen within a space corresponding to three picture fields.

The method is not restricted to the applications described, but can be used also with staggered lines and at the transmission and/or receiving end in television work.

I claim:

1. The method of producing an image upon a constantly moving medium, which comprises continuously moving an image carrier in front of the luminescent screen of a cathode ray tube, producig scanning strips on the luminescent screen and rhythmically changing the position of said scanning strips in a direction normal to their length in the sense of motion of the image carrier for a distance corresponding to the distance between adjacent lines of the picture plus the distance of movement of the image carrier during a line traversal.

2. The method of producing images upon a moving medium which comprises moving an image carrier at constant speed across the luminescent screen of a cathode ray tube, producing scanning strips on the luminescent screen, rhythmically changing the position of said scanning strips normal to their length and parallel to the direction of movement of said image carrier over the extent of one screen frame plus the distance corresponding to that moved by one image carrier frame during an entire frame scansion, and repeating the scansion while the once-scanned frame moves to a position adjacent that first occupied.

ROLF MÖLLER.